United States Patent
Honma et al.

(10) Patent No.: US 8,653,403 B2
(45) Date of Patent: Feb. 18, 2014

(54) BUTT-WELDED JOINT AND METHOD FOR MANUFACTURING SAME

(75) Inventors: Ryuichi Honma, Tokyo (JP); Tadashi Ishikawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/513,090

(22) PCT Filed: Dec. 3, 2010

(86) PCT No.: PCT/JP2010/071688
§ 371 (c)(1),
(2), (4) Date: May 31, 2012

(87) PCT Pub. No.: WO2011/068201
PCT Pub. Date: Jun. 9, 2011

(65) Prior Publication Data
US 2012/0237287 A1   Sep. 20, 2012

(30) Foreign Application Priority Data

Dec. 4, 2009  (JP) .................................. 2009-277007

(51) Int. Cl.
*B23K 15/00* (2006.01)
(52) U.S. Cl.
USPC ...................................... 219/121.14; 403/270
(58) Field of Classification Search
USPC ............ 403/270–272; 219/104–106, 121.13, 219/121.14, 121.63, 121.64
See application file for complete search history.

(56) References Cited

U.S. PATENT DOCUMENTS 2,963,129 A * 12/1960 Eberle .......................... 428/614
3,230,339 A *  1/1966 Opitz et al. .............. 219/121.14

(Continued)

FOREIGN PATENT DOCUMENTS

CN   1962153 A    5/2007
JP   54-159355 A   12/1979

(Continued)

OTHER PUBLICATIONS

International Search Report, dated Mar. 15, 2011, issued in PCT/JP2010/071688.

(Continued)

*Primary Examiner* — Daniel P. Stodola
*Assistant Examiner* — Nahid Amiri
(74) *Attorney, Agent, or Firm* — Birch, Stewart, Kolasch & Birch, LLP

(57) ABSTRACT

A butt-welded joint includes a pair of steel plates, a first weld metal that is formed at a butting portion of the pair of steel plates from a side of a first surface of the butt-welded joint to a side of a second surface opposite the first surface by irradiation of a first high-energy density beam from the side of the first surface, and a second weld metal that is formed by irradiation of a second high-energy density beam to cover an end surface of the first weld metal at the side of the first surface side of the first weld metal. A width $W_1$ of the first weld metal on the first surface and a width $W_2$ of the second weld metal on the first surface satisfy an equation $1.2 \leq W_2/W_1 \leq 3.5$, and a depth of the second weld metal from the first surface is 2.0 mm to 10.0 mm.

5 Claims, 3 Drawing Sheets

(56) References Cited

U.S. PATENT DOCUMENTS

| | | | | |
|---|---|---|---|---|
| 5,258,600 | A | * | 11/1993 | Arthur ................. 219/137 R |
| 5,615,826 | A | * | 4/1997 | Dixon et al. ............. 228/208 |
| 6,336,583 | B1 | * | 1/2002 | Wang et al. ............. 228/175 |
| 2004/0129686 | A1 | * | 7/2004 | Murphy ................ 219/121.14 |

FOREIGN PATENT DOCUMENTS

| | | | |
|---|---|---|---|
| JP | 56-158288 | A | 12/1981 |
| JP | 61-249688 | A | 11/1986 |
| JP | 61-296971 | A | 12/1986 |
| JP | 4-361876 | A | 12/1992 |
| JP | 7-178569 | A | 7/1995 |
| JP | 9-52183 | A | 2/1997 |
| JP | 10-314960 | A | 12/1998 |
| JP | 2000-140912 | A | 5/2000 |
| JP | 2001-212678 | A | 8/2001 |
| JP | 2002-35956 | A | 2/2002 |
| JP | 2004-181530 | A | 7/2004 |
| JP | 2005-125393 | A | 5/2005 |
| JP | 2006-37397 | A | 2/2006 |
| JP | 2007-92406 | A | 4/2007 |
| JP | 2007-322400 | A | 12/2007 |
| JP | 2008-111406 | A | 5/2008 |
| WO | WO 99/16101 | A2 | 4/1999 |

OTHER PUBLICATIONS

Notice of Allowance, dated Apr. 17, 2012, issued in Japanese Application No. 2011-518613.

Office Action, dated Dec. 6, 2011, issued in Japanese Application No. 2011-518613.

Chinese Office Action dated Feb. 5, 2013 issued in corresponding Chinese patent application No. 201080054321.X.

* cited by examiner

BUTT-WELDED JOINT AND METHOD FOR MANUFACTURING SAME

TECHNICAL FIELD

The present invention relates to a butt-welded joint and a manufacturing method thereof.

Priority is claimed on Japanese Patent Application No. 2009-277007, filed Dec. 4, 2009, the content of which is incorporated herein by reference.

RELATED ART

In recent years, to reduce $CO_2$ gas, which is a cause of global warming, or to cope with future depletion of fossil fuels such as petroleum, methods of using renewable natural energy have been actively pursued. Wind power is one of these, and large-scale wind power has spread globally.

Here, areas most suitable for wind power are areas where a strong wind can be expected to blow constantly. In particular, wind power (offshore wind power) on the sea to satisfy the above-described conditions has been planned and realized on a global scale (see, Patent documents 1 to 4).

In order to build a wind power-generating tower on the sea, it is necessary that a foundation portion of the tower be driven into the ground of the sea floor. In order to secure a sufficient height of turbine blades for the wind power from the sea level, it is necessary that the foundation portion of the tower have a sufficient length. Therefore, the plate thickness of a steel plate used in the foundation portion of the tower for wind power is required to be of a thickness corresponding to a length of the foundation portion length to ensure strength and rigidity. For example, a steel plate having a plate thickness greater than or equal to 30 mm is used in a jacket type foundation. A plate thickness greater than or equal to 50 mm (for example, approximately 100 mm) is used in a monopile foundation. In addition, the foundation portion has a pipe structure having a large section with a diameter of approximately 4 m, and the entire height of the tower even reaches 80 m or more.

However, it is extremely difficult to weld and assemble such a large structure at the coast near a construction site in a simple and highly efficient manner. In addition, there is a need for welding, in a highly efficient manner and on site, an extremely thick steel plate of which the maximum plate thickness may be up to 100 mm, which does not exist in the related art.

In general, high-energy density beam welding methods such as electron beam welding, laser beam welding, and the like are effective welding methods. However, it is not simple to arrange the conditions for performing high-energy density beam welding, and particularly in the electron beam welding, it is necessary that the welding be performed while maintaining a high vacuum state in a vacuum chamber, so that the size of a steel plate that can be welded is limited in the related art.

In contrast, in recent years, as a welding method in which an extremely thick steel plate having a plate thickness about 100 mm can be efficiently welded on site, the welding method (RPEBW: Reduced Pressure Electron Beam Welding), in which construction is possible under a low vacuum, has been developed and proposed by The Welding Institute in the United Kingdom (see, Patent document 5).

A wind power-generating tower on the sea is constantly exposed to strong winds or waves. For this reason, the structure of the foundation portion of the tower continuously and repeatedly receives loads due to strong winds, waves, or vibration caused by rotation of the turbine blades.

In such an environment, a welding portion of the foundation portion of the tower requires fatigue-resistant properties to vibration in a gigacycle range having a different order from that of a typical fatigue cycle. In particular, stress concentration is increased at the toe portion of a welding bead (weld metal), and therefore, fatigue strength against repeated loads at a welding joint is reduced.

In order to alleviate the stress concentration at such a toe portion, in the related art, a technology that alleviates the stress concentration by increasing the radius $\rho$ of curvature and a contact angle $\theta$ at a steel plate 21 and a toe portion of a welding bead 22 as shown in FIGS. 3A and 3B has been proposed.

In addition, FIG. 3A is a schematic cross-sectional view showing an example of a welding bead of a butt-welded joint according to the related art. In addition, FIG. 3B is a schematic enlarged cross-sectional view showing the vicinity of a toe portion T of the welding bead shown in FIG. 3A.

For example, in Patent document 6, increasing the radius $\rho$ of curvature and the contact angle $\theta$ by adjusting the flux component and the shielding gas component has been proposed.

In addition, in Patent document 7, reducing the stress concentration at the toe portion of the welding bead by reducing the ratio of the width of the welding bead to the thickness of the steel plate to 0.2 or less has been proposed.

CITATION

Patent Literature

[Patent document 1] Japanese Unexamined Patent Application, First Publication No. 2008-111406

[Patent document 2] Japanese Unexamined Patent Application, First Publication No. 2007-092406

[Patent document 3] Japanese Unexamined Patent Application, First Publication No. 2007-322400

[Patent document 4] Japanese Unexamined Patent Application, First Publication No. 2006-037397

[Patent document 5] Pamphlet of International Publication WO 99/16101

[Patent document 6] Japanese Unexamined Patent Application, First Publication No. 4-361876

[Patent document 7] Japanese Unexamined Patent Application, First Publication No. 2004-181530

SUMMARY OF INVENTION

Technical Problem

As described above, the degree of the stress concentration is increased at the toe portion of the welding bead. As a result, there is a problem in that fatigue strength of the butt-welded joint against the repeated load due to vibration of the gigacycle range caused by wind power, wave power, rotation of the turbine blades, or the like is reduced.

However, to cope with the stress concentration at the toe portion, in the related art, there are the following problems.

A method of Patent document 6 which is performed by gas shielded arc welding is not applicable to this problem in which welding is performed without using a shielding gas by high-energy density beam welding.

In addition, in Patent document 7, only the shape of the welding bead is specified; however a specific method to form the above-described width of the welding bead, and welding conditions, and the like for this are not disclosed. Accordingly, industrial utilization is extremely difficult due to poor reproducibility.

In addition, a method of Patent document 7 cannot be applied to improve fatigue-resistance properties to vibration of the gigacycle range as there is no more than a mention of the fatigue strength being improved corresponding to two million times at the welding joint.

An object of the invention is to provide, in a simple and excellent reproducible manner, a butt-welded joint which has fatigue properties which can withstand vibration in the gigacycle range, and has sufficient fracture toughness by alleviating stress concentration at the toe portion of the welding bead when high-energy density beam welding such as electron beam welding or the like is performed on a pair of steel plates without causing these problems.

Solution to Problem

To overcome the above problem, the present invention aims is to alleviate stress concentration at the toe portion of the welding bead to thereby improve fatigue properties by re-melting a welding bead to form a re-melted bead at a welding portion in the high-energy density beam welding such as electron beam welding, or the like.

An overview of the invention is as follows.

(1) A butt-welded joint according to an aspect of the invention includes: a pair of steel plates; a first weld metal that is formed at a butting portion of the pair of steel plates, from a first surface side of the pair of steel plates to a second surface side opposite the first surface side by irradiation of a first high-energy density beam from the first surface side; and a second weld metal that is formed by irradiation of a second high-energy density beam to cover an end surface of the first surface side of the first weld metal, wherein a width $W_1$ of the first weld metal on the first surface and a width $W_2$ of the second weld metal on the first surface satisfy the following equation (1), and a depth from the first surface of the second weld metal is 2.0 mm to 10.0 mm.

$$1.2 \leq W_2/W_1 \leq 3.5 \tag{1}$$

(2) The butt-welded joint described in the above (1) may further include a third weld metal that is formed by a third high-energy density beam to cover an end surface of the second surface side of the first weld metal, wherein a width $W_4$ of the first weld metal on the second surface and a width $W_5$ of the third weld metal on the second surface of the steel plate satisfy the following equation (2), and a depth from the second surface of the third weld metal is 2.0 to 10.0 min $$1.2 \leq W_5/W_4 \leq 3.5 \tag{2}$$

(3) In the butt-welded joint described in the above (1) or (2), a width $W_3$ of the first weld metal at a center of a plate thickness of the steel plate may be 15% or less of the plate thickness of the steel plate.

(4) In the butt-welded joint described in the above (1) or (2), a plate thickness of the steel plate may be 30 mm or larger, and yield strength of the steel plate may be 355 MPa or larger.

(5) The butt-welded joint described in the above (1) or (2) may be used in a structure or a steel pipe column which constitutes a foundation portion of a wind power-generating tower.

(6) A manufacturing method of a butt-welded joint according to an aspect of the invention includes: irradiating a butting portion of a pair of steel plates with a first high-energy density beam to form a first weld metal with a width $W_1$ on a first surface that is in an irradiation side of the first high-energy density beam of the pair of steel plates; and irradiating the first weld metal with a second high-energy density beam having energy density lower than that of the first high-energy density beam to form a second weld metal with a width $W_2$ on the first surface of the steel plate, wherein the width $W_1$ and the width $W_2$ satisfy the following equation (3), and a depth from the first surface of the second weld metal is 2.0 mm to 10.0 mm.

$$1.2 \leq W_2/W_1 \leq 3.5 \tag{3}$$

(7) In the manufacturing method of the butt-welded joint described in the above (6), a width $W_3$ of the first weld metal at a center of a plate thickness of the steel plate may be 15% or less of the plate thickness of the steel plate.

(8) In the manufacturing method of the butt-welded joint described in the above (6) or (7), both the first high-energy density beam and the second high-energy density beam may be an electron beam.

(9) In the manufacturing method of the butt-welded joint described in the above (6) or (7), both irradiation of the first high-energy density beam and irradiation of the second high-energy density beam may be performed by setting only a formation region of a welding portion of the pair of steel plates and the vicinity of the region as being under vacuum.

(10) In the manufacturing method of the butt-welded joint described in the above (6) or (7), as the steel plate, a steel plate having a plate thickness of 30 mm or larger and yield strength of 355 MPa or larger may be used.

Advantageous Effects of Invention

According to the invention, when a pair of high-strength steel plates are subjected to high-energy density beam welding to obtain a welding structure, a second weld metal having a smoother toe portion than that of the first weld metal is formed by re-melting the first weld metal, and therefore, stress concentration at the toe portion is alleviated. As a result, a butt-welded joint which has fatigue-resistant properties to a vibration environment of a gigacycle range, and excellent fracture toughness may be achieved.

DESCRIPTION OF EMBODIMENTS

In the invention, in a welding bead which is formed by welding (high-energy density beam welding) a pair of high-strength steel plates by irradiating with a high-energy density beam such as an electron beam, laser beam, or the like, the welding bead (first weld metal) is re-melted to form a re-melted bead (second weld metal), and therefore, stress concentration at the toe portion of the first weld metal is alleviated, thereby improving fatigue-resistant properties to a vibration environment of a gigacycle range.

Hereinafter, a butt-welded joint according to an embodiment of the invention will be described with reference to the accompanying drawings.

Figure 1A:
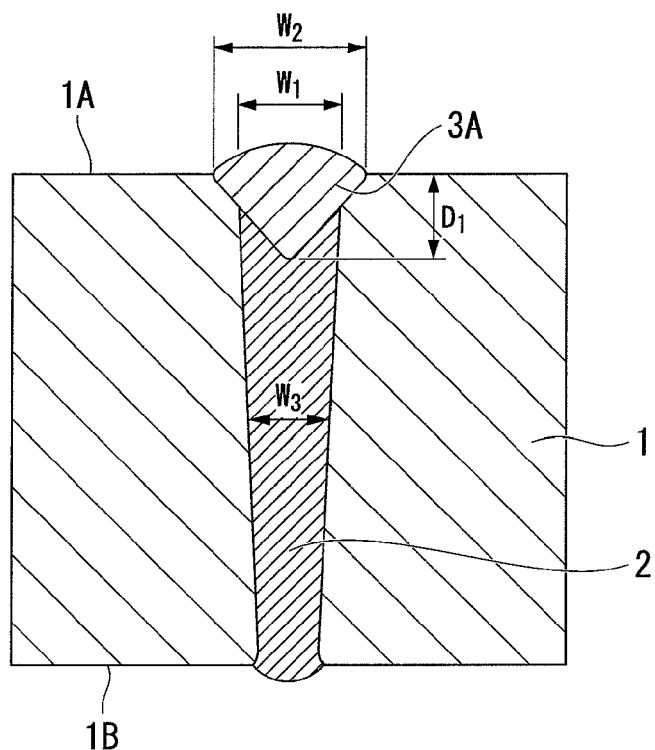
FIG. 1A is a schematic cross-sectional view showing a butt-welded joint according to an embodiment of the invention.

FIG. 1A is a schematic cross-sectional view showing, in a direction perpendicular to a longitudinal direction of the first weld metal, the first weld metal of the butt-welded joint according to an embodiment of the invention. As shown in FIG. 1A, a butt-welded joint according to an embodiment of the invention includes a first weld metal 2 that is formed, at a butting portion of the pair of steel plates 1, by irradiation of first high-energy density beam from the first surface side of the pair of steel plates 1, and a second weld metal 3A that is formed by second high-energy density beam to cover the whole end surface of the first surface 1A side of the first weld metal 2. In addition, the first weld metal 2 is formed from the first surface 1A side to the second surface 1B side opposite the first surface 1A.

In addition, a width $W_1$ of the first weld metal 2 on the first surface 1A and a width $W_2$ of the second weld metal 3A on the first surface 1A satisfy the following equation (1), and a depth $D_1$ from the first surface 1A of the second weld metal 3A is 2.0 to 10.0 mm.

$$1.2 \leq W_2/W_1 \leq 3.5 \quad (1)$$

Here, $W_1$ is an estimated width (the estimation method of $W_1$ will be described later) of the first weld metal 2 on the first surface 1A side that is an irradiation side of the first high-energy density beam as described above. In addition, $W_2$ is a width on the first surface 1A of the second weld metal 3A formed by the irradiation of the second high-energy density beam.

Figure 3A:
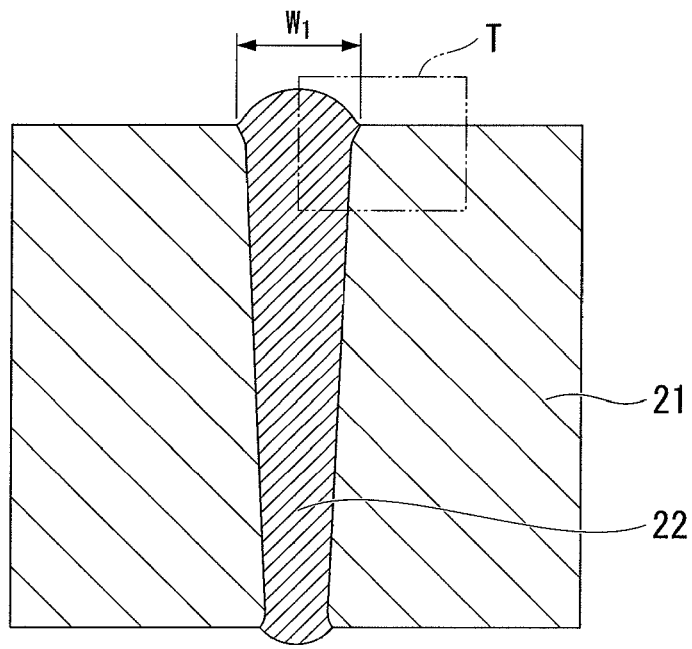
FIG. 3A is a schematic cross-sectional view showing an example of a welding bead of a butt-welded joint according to the related art.

As shown in FIG. 1A, a section of the irradiation side of the first high-energy density beam of the first weld metal 2 is covered by the second weld metal 3A. In addition, a shape of the toe portion of the second weld metal 3A is smoothly formed in comparison with a welding bead according to the related art shown in FIG. 3A. Due to this, stress concentration at the toe portion is alleviated.

In addition, according to the present embodiment, the width $W_2$ of the second weld metal 3A is required to satisfy $1.2 \leq W_2/W_1 \leq 3.5$ with respect to the width $W_1$ of the first weld metal.

When a ratio $W_2/W_1$ of the width $W_2$ of the second weld metal 3A and the width $W_1$ of the first weld metal is too small, the effect of alleviating the stress concentration is reduced, and therefore, $W_2/W_1$ should be 1.2 or larger. In addition, $W_2/W_1$ may be 1.2 or larger, or 1.8 or larger, as necessary.

Meanwhile, when the width $W_2$ of the second weld metal 3A is increased, adverse effects of tensile residual stress in a direction perpendicular to a welding line which is formed at the toe portion of the second weld metal 3A on the first surface 1A cannot be ignored. In addition, when $W_2/W_1$ is significantly increased to cause an increase in a coarse particle region, joint toughness may be reduced. For this reason, $W_2/W_1$ is 3.5 or less. In addition, $W_2/W_1$ may be 3.2 or less, or 2.8 or less, when necessary.

Here, a shape of the section of the first surface 1A side of the first weld metal 2 which is formed by the irradiation of the first high-energy density beam cannot be directly confirmed after the second weld metal 3A is formed. However, the width $W_1$ of the first weld metal 2 on the first surface 1A side can be estimated by the following method.

Figure 2:
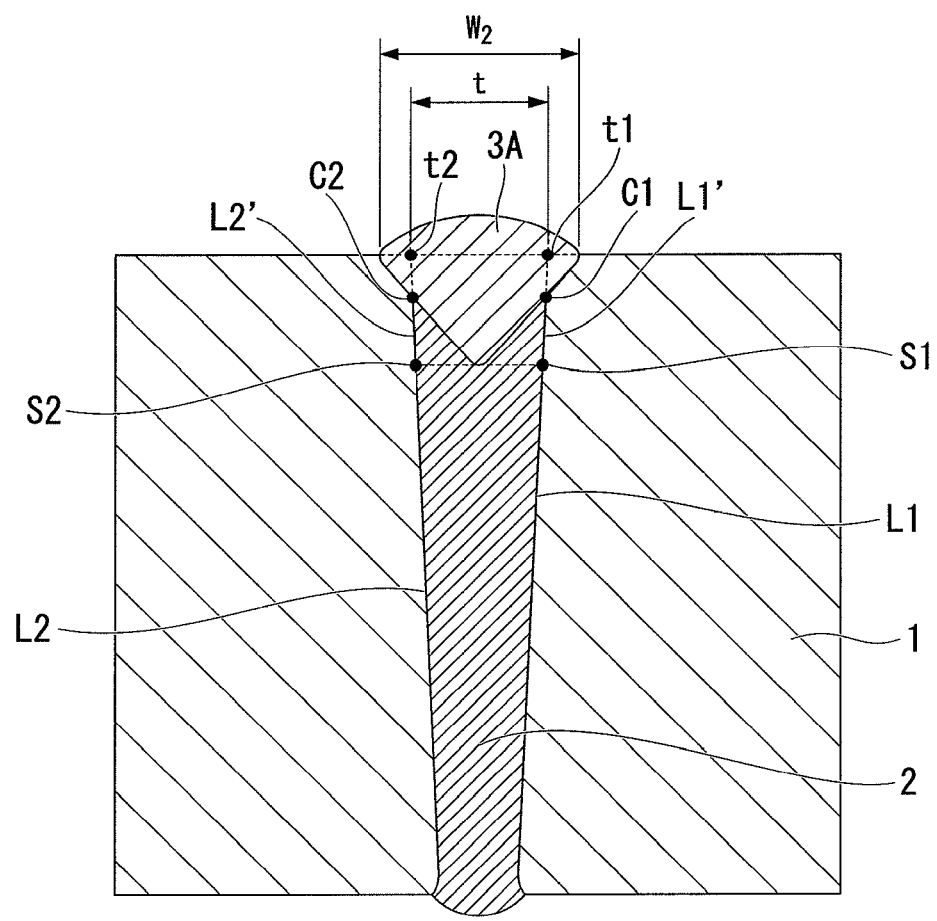
FIG. 2 is a schematic cross-sectional view describing a method of estimating a width $W_1$ of a first weld metal 2 of a butt-welded joint according to an embodiment of the invention.

FIG. 2 is a schematic cross-sectional view for describing a positional relationship between the first weld metal 2 and the second weld metal 3A according to the present embodiment. FIG. 2 is a schematic cross-sectional view in a direction perpendicular to a longitudinal direction of the first weld metal 2.

From a border line of the first weld metal 2 and the second weld metal 3A on the section, both end points in a width direction of the first weld metal 2 are assumed as being C1 and C2.

Next, on a border line L1 of one base material (steel plate 1) and the first weld metal 2 on the same section, a position with roughly the same depth as that of a deepest portion of the second weld metal 3A is assumed as being S1. In addition, on a border line L2 of the other base material and the first weld metal 2, S2 is defined in the same manner.

Next, straight lines obtained by combining S1 and S2 with C1 and C2, respectively, are assumed as being L1 and L2, respectively. Intersection points between L1' and L2' and the first surface 1A are assumed as being t1 and t2. A distance t between t1 and t2 approximates the width $W_1$ of the first weld metal before forming the second weld metal 3A with sufficient accuracy. For this reason, the distance t can be regarded as $W_1$.

In the present embodiment, a depth $D_1$ from the first surface 1A of the steel plate 1 in the second weld metal 3A is required to be 2.0 to 10.0 mm. When the depth $D_1$ of the second weld metal 3A is too shallow, little change in the shape of the toe portion of the first weld metal 2 may be seen, and the effect of alleviating the stress concentration may be reduced, and therefore, the depth $D_1$ is assumed as being 2.0 mm or larger. The depth $D_1$ may be assumed as being 3.0 mm or larger, or 4.0 mm or larger, as necessary.

Meanwhile, when the depth $D_1$ of the second weld metal 3A is too deep, tensile residual stress applied to the vicinity of the second weld metal 3A inside the steel plate 1 is increased, and thereby fatigue-resistant properties may be reduced. In addition, brittle deterioration may occur at the welding portion and the vicinity thereof, and therefore, the depth $D_1$ is assumed as being 10.0 mm or less. The depth $D_1$ is assumed as being 9.0 mm or less, 8.0 mm or less, or 7.0 mm or less, as necessary.

In addition, in the present embodiment, the depth $D_1$ is a distance from the first surface 1A of the irradiation side of the second high-energy density beam to the deepest portion of the second weld metal 3A.

Figure 1B:
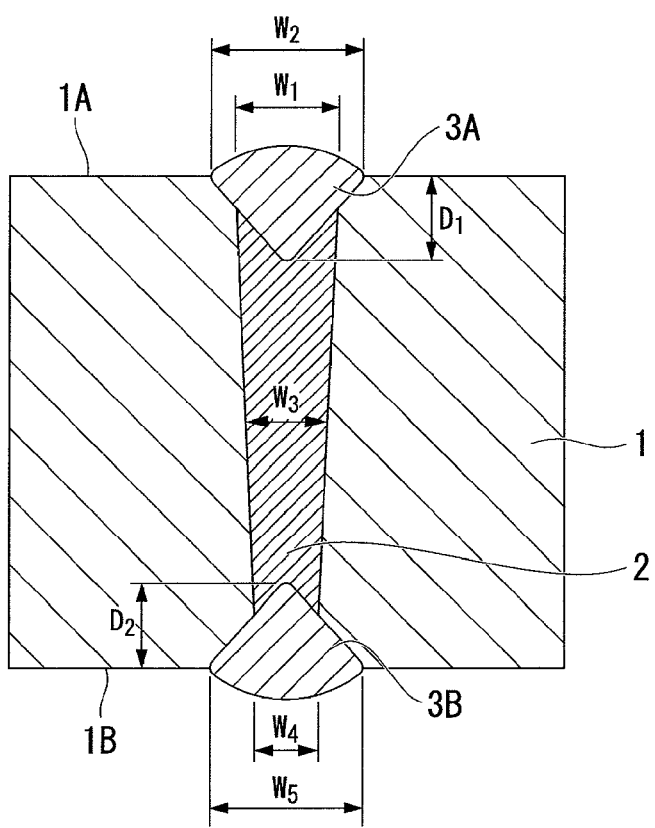
FIG. 1B is a schematic cross-sectional view showing a butt-welded joint according to an embodiment of the invention.

In addition, as shown in FIG. 1B, in the butt-welded joint according to an embodiment of the invention, a third weld metal 3B may be formed so as to cover a section of a second surface 1B side opposite the first surface 1A, within the section of the first weld metal 2. In this instance, it is preferable that a width $W_4$ of the first weld metal 2 on the second surface 1B and a width $W_5$ of the third weld metal on the second surface 1B satisfy the following equation (2), and a depth $D_2$ from the second surface 1B of the third weld metal 3B be 2.0 to 10.0 mm.

$$1.2 \leq W_5/W_4 \leq 3.5 \quad (2)$$

In addition, the third weld metal 3B may be formed by a third high-energy density beam.

In addition, a shape of the section of the second surface 1B side of the first weld metal 2 that is formed by irradiation of the first high-energy density beam cannot be directly confirmed after the third weld metal 3B is formed; however, the width $W_4$ of the first weld metal 2 on the second surface 1B side can be estimated by the same method as the estimation method of the width $W_1$ of the first weld metal 2.

In this manner, by preparing the second weld metal 3A and the third weld metal 3B, fatigue-resistant properties in front and rear surfaces of the steel plate 1 may be improved.

In addition, as the above-described first high-energy density beam, second high-energy density beam, and third high-energy density beam, an electron beam, laser beam, or the like may be used.

In addition, in the above-described first high-energy density beam welding, in a case of using, for example, an electron beam, a steel plate having a plate thickness 50 mm may be irradiated under conditions in which acceleration voltage is 150V, a beam current is 180 mA, and a welding speed is about 100 to 300 mm/minute.

In addition, when performing the above-described first high-energy density beam welding, the butt-welded joint may be manufactured in a manner such that a metal foil with a thickness of about 0.1 mm is inserted and welded on a butt surface of the pair of steel plates 1. As the metal foil, for example, a Ni foil, or the like may be used. In this manner, by inserting the metal foil at the time of the first high-energy density beam welding, toughness deterioration of the welding portion may be suppressed.

In addition, the above-described second high-energy density beam may be irradiated under conditions such as a heat input amount of about 1/10 of a heat input amount of the first high-energy density beam welding, for example, an acceleration voltage of 90V of a beam current 60 mA, and a welding speed of higher than 500 mm/minute. This is because the effect of alleviating the stress concentration at the toe portion is reduced when the heat input amount at the time of re-melting the first weld metal is too small, and toughness deterioration at the welding portion occurs when the heat input amount is too large.

In addition, it is preferable that a high-speed oscillation function be used when performing irradiation of the second high-energy density beam. This is because both toe portions of the first weld metal are simultaneously melted, that is, because re-melting of the toe portion is made possible at a substantially high-speed in comparison with a re-melting process (TIG dressing) of the toe portion of the first weld metal, for example, using a TIG arc. In addition, a desired width $W_2$ and depth $D_1$ may be readily achieved by adjusting the acceleration voltage, the beam current, the welding speed, or the oscillation condition, and the like based on the width $W_1$ measured when performing the invention.

In addition, irradiation conditions of the third high-energy density beam so as to form the third weld metal 3B may be substantially the same as the above irradiation conditions of the second high-energy density beam; however, they may be suitably changed without departing from the scope of the present embodiment of the invention.

When a beam irradiation region is increased at the time of welding by the first high-energy density beam, the heat input amount applied to the steel plate becomes excessive. As a result, tissues of an FL (Fusion Line) portion may be coarsened, or an island-like martensite (MA: martensite-austenite constituent) that is an embrittlement phase may be formed. For this reason, the increase in the beam irradiation region may cause a reduction in toughness of the weld metal or the FL portion.

In addition, when manufacturing a welded joint using an RPEBW welding as the first high-energy density beam welding, the width of the first weld metal tends to be increased in comparison with a welding joint manufacturing by an electron beam welding (EBW welding) in a high-vacuum state inside a vacuum chamber.

Because of this, it is preferable that the width $W_1$ of the first weld metal be 30% or less of the plate thickness of the steel plate, or 20% or less thereof so as to stably secure a Charpy value vE of the butt-welded joint even when using the RPEBW welding.

In addition, it is preferable that a width $W_3$ of the first weld metal at the center of the plate thickness of the steel plate be 15% or less, or 10% or less. However, the width $W_1$ may be limited to 15 mm or less, 11 mm or less, or 7 mm or less. The width $W_3$ may be limited to 7 mm or less, 6 mm or less, or 5 mm or less.

In addition, when the widths $W_1$ and $W_3$ of the first weld metal are too narrow, it is difficult to completely melt a groove surface by an incident direction and stability of the first high-energy density beam, and therefore, it is preferable that the width $W_1$ of the first weld metal be 2% or larger than the plate thickness of the steel plate, and the width $W_3$ of the first weld metal be 20% or larger than the plate thickness of the steel plate at the center of the plate thickness of the steel plate.

In addition, the welding joint according to the present embodiment may be used to perform the high-energy density welding on the high-strength steel plate to obtain a welding structure. The steel plate to be used is not limited thereto; however, the steel plate of which yield strength is 355 MPa or larger may be preferably used. Such a high-strength steel plate may be manufactured from steel for a welded structure with the known compositions. In addition, the yield strength of the steel plate may be 600 MPa or less. In addition, tensile strength of the steel plate may be limited to 400 MPa or larger or 490 MPa or larger, or 780 MPa or less or 690 MPa or less.

For example, a composition of the steel plate which contains, by mass %, 0.02 to 0.20% C, 0.01 to 1.0% Si, 0.3 to 2.1% Mn, 0.001 to 0.20% Al, ≤0.02% N, ≤0.01% P, ≤0.01% S, and 0.50 to 4.0% Ni is used as the basic composition. In addition to the basic composition, the steel plate may further contain, by 8% or less, or by 3% or less in total, one, two, or more of Cr, Mo, Cu, W, Co, V, Nb, Ti, Zr, Ta, Hf, REM, Y, Ca, Mg, Te, Se, and B in accordance with required properties such as improvement in base material strength or joint toughness, and the like.

The plate thickness of the steel plate is not particularly limited; however, a high-strength steel plate with the plate thickness of 30 mm or larger where the above problem becomes noticeable may be used. However, it is unnecessary to limit the plate thickness to 30 mm or larger. When the plate thickness is 6 mm or larger, the effects of the invention may be obtained, and therefore, the plate thickness may be 6 mm or larger. The plate thickness may be 12 mm or larger, or 20 mm or larger, as necessary. Higher effects may be obtained when the plate thickness is 50 mm or larger, and therefore, the plate thickness may be 50 mm or larger. Meanwhile, when the plate thickness becomes too thick, it is difficult to perform the high-energy density beam welding, and therefore, the plate thickness may be limited to 200 mm or less, 150 mm or less, or 100 mm or less.

In addition, in a wind power-generating tower, or the like, the steel plate is subjected to a bending process, and then is welded to a steel pipe, or steel pipes are welded. This case is basically a butt-welded joint of the steel plate having been subjected to the bending process. Accordingly, the invention can be applied to welding for manufacturing the steel pipe from the steel plate having been subjected to the bending process, or welding between the steel pipes.

In the butt-welded joint according to the present embodiment, it is preferable that hardness of the first weld metal, the second weld metal, and the third weld metal be 110% or larger and 150% or less of the base material of the steel plate.

Preferably, the hardness of the weld metal be 110% or larger than the hardness of the base material of the steel plate so as to secure hardenability to prevent coarse ferrite from being generated. However, when the hardness is extremely increased, a deterioration in fracture toughness is caused due to an increase in local stress, and therefore, 150% or less may be preferable.

The hardness difference as described above may be achieved in a manner such that hardness of the weld metal is prevented from being too high by adjusting the cooling rate after welding.

In the butt-welded joint according to the present embodiment, the first weld metal is re-melted, and the second weld metal and the third weld metal which have a smoother toe portion than that of the first weld metal are formed. As a result, stress concentration at the toe portion of the second weld metal and the third weld metal is alleviated, and therefore, fatigue-resistant properties to a vibration environment of a gigacycle range may be improved. In addition, sufficient fracture toughness may be obtained.

Because of this, the butt-welded joint according to the present embodiment may be used for a structure or a steel pipe column which constitutes a foundation portion of the wind power-generating tower requiring the fatigue-resistant properties to the vibration of the gigacycle range.

In the manufacturing method of the butt-welded joint according to the present embodiment, it is preferable that irradiation of the first high-energy density beam, the second high-energy density beam, and the third high-energy density beam be all performed by setting only a formation region of the welding portion of the steel plate and the vicinity of the region as being under vacuum.

By performing irradiation of the beam under the above-described conditions, it is possible to weld a large structure such as a wind power-generating tower on the sea, and the like near a construction site in a simple and highly efficient manner. As a result, the butt-welded joint according to the present embodiment may be manufactured in a simple and highly efficient manner.

EXAMPLES

Next, the invention will be described in accordance with examples; however, conditions in the examples are first conditions adopted to verify feasibility and effectiveness of the invention, and the invention is not limited to only the examples.

The invention may adopt various conditions or combination thereof as long as they achieve objects of the invention without departing from the gist of the invention.

Electron beam welding (welding by the first high-energy density beam) was performed under welding conditions shown in Table 3 using a steel plate having a chemical composition shown in Table 1, and yield strength and tensile strength in each plate thickness, so that a butt-welded joint having a first weld metal with a width $W_1$ on a surface of a steel plate on an irradiation side of an electron beam was manufactured. In addition, a width $W_3$ of the first weld metal at a center (t/2) of a plate thickness t of the steel plate was adjusted as shown in Table 5.

In addition, as necessary, the butt-welded joint which has a composition shown in Table 2 was manufactured by inserting a metal foil with a thickness of 0.1 mm to a groove surface.

Next, under re-melting conditions shown in Table 4, electron beam welding (welding by the second high-energy density beam) was performed, so that the second weld metal was formed so as to cover a section of an irradiation side of the first weld metal. In this instance, the second weld metal having a shape shown in Table 5 was formed by adjusting a depth $D_1$, a heat input amount, and a width $W_2$ of the second weld metal. In addition, in the adjustment of the width $W_2$ of the second weld metal, an oscillation function attached to an electron beam welder was used.

In addition, with respect to test number 19, welding by the second high-energy density beam was performed under the re-melting conditions E3 shown in Table 4, so that the second weld metal was formed so as to cover a section of the irradiation side of the first weld metal. At the same time, welding by the third high-energy density beam was performed under re-melting conditions E1, so that the third weld metal was formed so as to cover a section of an opposite side of the irradiation side of the first high-energy density beam of the first weld metal. In this instance, the third weld metal having a shape shown in Table 5 was formed by adjusting a depth D2, a heat input amount, and a width $W_5$ of the third weld metal.

In addition, welding by the first high-energy density beam, the second high-energy density beam, and the third high-energy density beam were all performed at a chamber pressure shown in Table 5. In addition, numbers at a lower end of a test number 19 (numbers in parentheses) of Table 5 respectively indicate a re-melting condition at the time of irradiation of the third high-energy density beam, a width ($W_4$) of the first weld metal in a rear surface of the steel plate, a width ($W_5$) of the third weld metal formed by irradiation of the third high-energy density beam, a re-melting ratio ($W_5/W_4$), and a depth ($D_2$) of the third weld metal.

With respect to performance of the butt-welded joint obtained in the above-described manner, joint characteristics shown in Table 5 were estimated.

First, a Charpy value vE (J) was a value obtained at a test temperature of −40° C. in an impact test by sampling a 2 mm V notch Charpy test piece in which a notch position from just under the surface of the welding joint was a center of the second weld metal. The results are shown in Table 5. In addition, the Charpy impact test was performed in accordance with JIS Z 2242.

A fatigue test was performed using a servo-hydraulic fatigue test machine (Hz) by sampling a fatigue test piece in accordance with JIS Z 3103-1987 from the obtained butt-welded joint. The fatigue test was performed under test conditions such as at room temperature in the air, a stress ratio of 0.1, a repetition rate 5 Hz to 40 Hz, and a stress range of 80 MPa to 200 MPa. As shown in Table 5, for fatigue strength, joint fatigue strength F1 of the repetition number of two million times ($2\times10^6$ times) in a breakage life, and joint fatigue strength F2 corresponding to a gigacycle ($10^9$ times) were measured.

In addition, fatigue strength F1' of the repetition number of $2\times10^6$ times and fatigue strength F2' in the gigacycle up to $2\times10^9$ times were obtained by sampling an ultrasonic fatigue test piece from the obtained butt-welded joint, separately from the fatigue test piece. Next, by comparing results of these two conditions, a reduction ratio (F2'/F1') therebetween was obtained.

Subsequently, the joint fatigue strength (estimation value) F2 under the gigacycle was estimated by multiplying, by the reduction ratio (F2'/F1'), the joint fatigue strength F1 of $2\times10^6$ times obtained by the joint fatigue test.

The above results are shown in Table 5.

TABLE 1

| | CHEMICAL COMPOSITION (mass %) | | | | | | | | PLATE THICKNESS t: (mm) | YIELD STRENGTH (MPa) | TENSILE STRENGTH (MPa) |
|---|---|---|---|---|---|---|---|---|---|---|---|
| | C | Mn | Si | P | S | Ni | Cr | N | | | |
| B1 | 0.1 | 1.2 | 0.41 | 0.003 | 0.003 | 0.5 | 0.2 | 0.005 | 30 | 455 | 669 |
| | | | | | | | | | 50 | 432 | 632 |
| | | | | | | | | | 80 | 418 | 615 |
| | | | | | | | | | 100 | 392 | 576 |
| B2 | 0.2 | 1.5 | 0.25 | 0.003 | 0.004 | 1.1 | 0.2 | 0.004 | 30 | 534 | 785 |
| | | | | | | | | | 50 | 511 | 745 |
| | | | | | | | | | 80 | 491 | 722 |
| | | | | | | | | | 100 | 478 | 703 |
| B3 | 0.05 | 2.1 | 0.21 | 0.004 | 0.004 | 0.5 | 0 | 0.004 | 30 | 413 | 551 |
| | | | | | | | | | 50 | 392 | 521 |
| | | | | | | | | | 80 | 368 | 491 |
| | | | | | | | | | 100 | 355 | 465 |

TABLE 2

| | METAL FOIL COMPOSITION | | |
|---|---|---|---|
| | CHEMICAL COMPOSITION (mass %) | | |
| | Ni | Cr | Fe |
| F1 | 100 | — | — |
| F2 | 18.6 | 8.5 | Bal |

TABLE 3

| | WELDING CONDITIONS | | |
|---|---|---|---|
| WELDING NUMBER | ACCELERATING VOLTAGE | BEAM CURRENT | WELDING SPEED |
| W1 | 150 kV | 180 mA | 250 mm/min |
| W2 | 150 kV | 220 mA | 250 mm/min |
| W3 | 150 kV | 260 mA | 250 mm/min |
| W4 | 150 kV | 170 mA | 150 mm/min |
| W5 | 150 kV | 220 mA | 100 mm/min |
| W6 | 150 kV | 270 mA | 100 mm/min |
| W7 | 150 kV | 160 mA | 300 mm/min |

TABLE 4

| | REMELTING CONDITIONS | | |
|---|---|---|---|
| WELDING NUMBER | ACCELERATING VOLTAGE | BEAM CURRENT | WELDING SPEED |
| E1 | 90 kV | 60 mA | 550 mm/min |
| E2 | 90 kV | 60 mA | 500 mm/min |
| E3 | 110 kV | 60 mA | 500 mm/min |
| E4 | 90 kV | 60 mA | 1800 mm/min |
| E5 | 150 kV | 70 mA | 300 mm/min |

TABLE 5

| TEST NUMBER | STEEL | PLATE THICKNESS t: (mm) | METAL FOIL | CHAMBER PRESSURE (Pa) | WELDING CONDITION | REMELTING CONDITIONS SECOND HIGH ENERGY DENSITY BEAM (THIRD HIGH ENERGY DENSITY BEAM) CONDITION | OSCILLATION | WELD METAL WIDTH (mm) AFTER WELDING $W_1(W_4)$ | AFTER REMELTING $W_2(W_5)$ | $t/2$ PORTION $W_3$ |
|---|---|---|---|---|---|---|---|---|---|---|
| 1 | B1 | 50 | F1 | 0.07 | W1 | E1 | NOT USED | 9.1 | 11.8 | 3.6 |
| 2 | B1 | 50 | F1 | 7 | W1 | E2 | USED | 8.8 | 30.1 | 3.5 |
| 3 | B1 | 50 | F2 | 7 | W1 | E3 | NOT USED | 9.4 | 19.8 | 3.8 |
| 4 | B1 | 50 | F2 | 7 | W2 | E3 | USED | 10.2 | 28.3 | 4.1 |
| 5 | B3 | 50 | NOT USED | 7 | W3 | E2 | USED | 13.1 | 17.1 | 5.2 |
| 6 | B1 | 80 | F1 | 0.07 | W4 | E1 | NOT USED | 8.8 | 11.6 | 3.5 |
| 7 | B3 | 80 | NOT USED | 7 | W4 | E2 | USED | 8.8 | 28.9 | 3.5 |
| 8 | B1 | 100 | F1 | 0.07 | W5 | E1 | USED | 9.3 | 14.1 | 3.7 |
| 9 | B2 | 100 | F1 | 7 | W5 | E3 | NOT USED | 9.9 | 20.2 | 4.0 |
| 10 | B1 | 100 | F2 | 7 | W6 | E1 | USED | 11.9 | 40.1 | 4.8 |
| 11 | B2 | 30 | F1 | 0.07 | W7 | E2 | USED | 7.6 | 25.6 | 2.9 |
| 12 | B2 | 30 | NOT USED | 0.07 | W7 | E2 | NOT USED | 8.2 | 18.1 | 3.3 |
| 13 | B1 | 30 | NOT USED | 7 | W7 | E2 | NOT USED | 8.1 | 15.8 | 3.2 |
| 14 | B1 | 50 | NOT USED | 0.07 | W1 | E3 | USED | 8.9 | 28.6 | 3.6 |
| 15 | B1 | 80 | NOT USED | 0.07 | W4 | E3 | NOT USED | 9.2 | 18.5 | 3.7 |
| 16 | B3 | 100 | F1 | 0.07 | W5 | E1 | NOT USED | 9.5 | 12.1 | 3.8 |
| 17 | B3 | 100 | NOT USED | 7 | W5 | E1 | NOT USED | 9.9 | 12.3 | 4.0 |

TABLE 5-continued

| | | | | | | | | | | |
|---|---|---|---|---|---|---|---|---|---|---|
| 18 | B1 | 30 | F1 | 7 | W7 | E1 | USED | 8.3 | 15.2 | 3.3 |
| 19 | B1 | 80 | F1 | 0.07 | W4 | E3 (E1) | NOT USED (NOT USED) | 9.2 (8.5) | 18.7 (11.3) | 3.7 |
| 20 | B2 | 50 | F1 | 7 | W3 | E1 | NOT USED | 12.4 | 10.1 | 5.0 |
| 21 | B3 | 50 | NOT USED | 0.07 | W1 | E2 | USED | 8.6 | 37.6 | 3.4 |
| 22 | B1 | 50 | F1 | 0.07 | W1 | NO REMELTING | | 9.1 | — | 3.6 |
| 23 | B2 | 80 | F2 | 7 | W4 | E1 | NOT USED | 9.9 | 11.2 | 4.0 |
| 24 | B2 | 100 | F1 | 7 | W5 | E3 | USED | 9.8 | 35.5 | 3.9 |
| 25 | B1 | 100 | F1 | 7 | W6 | E1 | NOT USED | 11.7 | 11.1 | 4.7 |
| 26 | B1 | 30 | F2 | 0.07 | W7 | E4 | USED | 8.2 | 28.2 | 3.3 |
| 27 | B3 | 30 | NOT USED | 0.07 | W7 | E5 | NOT USED | 8.9 | 10.6 | 3.6 |
| 28 | B1 | 30 | NOT USED | 7 | W7 | E1 | NOT USED | 10.2 | 13.2 | 4.9 |
| 29 | B3 | 80 | NOT USED | 0.07 | W4 | ARC WELDING(TIG) | | 10.3 | 45.3 | 4.1 |

| | | | WELD JOINT CHARACTERISTICS | | | | |
|---|---|---|---|---|---|---|---|
| TEST NUMBER | REMELTING RATIO $W_2/W_1$ $(W_5/W_4)$ | DEPTH OF SECOND THIRD WELD METAL $D_1$ $(D_2)$ (mm) | FATIGUE STRENGTH IN TWO MILLION CYCLES F1: MPa | FATIGUE STRENGTH DECLINE RATIO F2'/F1' | FATIGUE STRENGTH IN GIGA- CYCLES F2: MPa | WELD METAL CHARPY VALUE AT −40° C. (J) | NOTES |
| 1 | 1.3 | 4.4 | 169 | 82% | 139 | 293 | EXAMPLE |
| 2 | 3.4 | 4.8 | 168 | 81% | 136 | 256 | EXAMPLE |
| 3 | 2.1 | 8.0 | 181 | 83% | 151 | 302 | EXAMPLE |
| 4 | 2.8 | 5.9 | 164 | 88% | 145 | 236 | EXAMPLE |
| 5 | 1.3 | 4.5 | 166 | 84% | 140 | 125 | EXAMPLE |
| 6 | 1.3 | 4.1 | 159 | 77% | 123 | 236 | EXAMPLE |
| 7 | 3.3 | 4.2 | 158 | 84% | 132 | 168 | EXAMPLE |
| 8 | 1.5 | 3.2 | 164 | 83% | 136 | 229 | EXAMPLE |
| 9 | 2.0 | 7.6 | 171 | 83% | 142 | 189 | EXAMPLE |
| 10 | 3.4 | 4.2 | 182 | 80% | 146 | 287 | EXAMPLE |
| 11 | 3.4 | 4.8 | 165 | 84% | 138 | 187 | EXAMPLE |
| 12 | 2.2 | 5.6 | 171 | 79% | 135 | 68 | EXAMPLE |
| 13 | 2.0 | 5.2 | 182 | 80% | 146 | 163 | EXAMPLE |
| 14 | 3.2 | 5.5 | 187 | 80% | 149 | 125 | EXAMPLE |
| 15 | 2.0 | 6.8 | 182 | 74% | 135 | 171 | EXAMPLE |
| 16 | 1.3 | 4.8 | 169 | 86% | 146 | 345 | EXAMPLE |
| 17 | 1.2 | 4.2 | 181 | 89% | 161 | 148 | EXAMPLE |
| 18 | 1.8 | 4.1 | 156 | 83% | 129 | 281 | EXAMPLE |
| 19 | 2.0 (1.3) | 6.5 (4.3) | 192 | 85% | 164 | 241 | EXAMPLE |
| 20 | 0.8 | 3.1 | 103 | 80% | 82 | 169 | COMPARATIVE EXAMPLE |
| 21 | 4.4 | 4.7 | 152 | 81% | 123 | 14 | COMPARATIVE EXAMPLE |
| 22 | — | — | 82 | 83% | 68 | 286 | COMPARATIVE EXAMPLE |
| 23 | 1.1 | 3.3 | 101 | 88% | 89 | 169 | COMPARATIVE EXAMPLE |
| 24 | 3.6 | 6.1 | 153 | 65% | 99 | 21 | COMPARATIVE EXAMPLE |
| 25 | 0.9 | 3.6 | 110 | 79% | 87 | 257 | COMPARATIVE EXAMPLE |
| 26 | 3.4 | 1.0 | 95 | 85% | 81 | 269 | COMPARATIVE EXAMPLE |
| 27 | 1.2 | 12.0 | 109 | 91% | 99 | 11 | COMPARATIVE EXAMPLE |
| 28 | 1.3 | 4.5 | 145 | 85% | 123 | 12 | COMPARATIVE EXAMPLE |
| 29 | 4.4 | 0.9 | 92 | 89% | 82 | 158 | COMPARATIVE EXAMPLE |

In Table 5, test numbers 1 to 19 are examples of the invention, and all meet the requirements of the invention. In Table 5, mechanical properties including the joint fatigue strength and the Charpy value of the repetition number of two million times ($2\times10^6$ times) and of the gigacycle ($10^9$ times) were all good.

In addition, the test number 19 was the invention in which a re-melted bead (the second weld metal and the third weld metal) was formed on both front and rear surfaces of a steel material. In this manner, the first weld metal was re-melted on both the front and rear surfaces of the steel material to thereby form the second weld metal and the third weld metal, and therefore, mechanical properties including the joint fatigue strength and the Charpy value of the repetition number of two million times and of the gigacycle were all good.

Figure 3B:
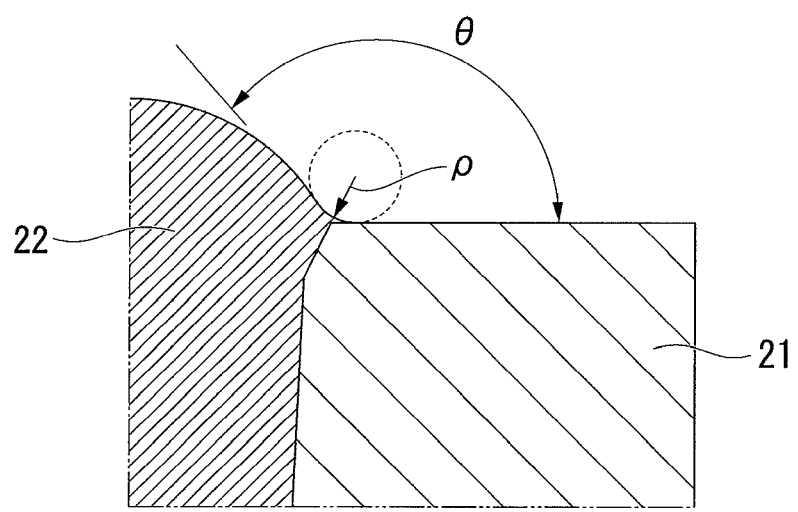
FIG. 3B is a schematic enlarged cross-sectional view showing the vicinity of a toe portion T of the welding bead shown in FIG. 3A.

In the test numbers 20, 21, 24, and 26, the width $W_2$ of the second weld metal was narrow, and re-melting of a metal toe portion of the first weld metal was insufficiently performed, and therefore, a contact angle (see, FIG. 3B) of the toe portion was large, and the joint fatigue strength F2 at the time of the gigacycle was significantly reduced.

Meanwhile, in the test numbers 22 and 25, the width $W_2$ of the second weld metal was sufficiently wide, and melting of the toe portion of the first weld metal was sufficiently performed; however, embrittlement of tissues on the vicinity of the surface of the steel plate by the second weld metal intensely occurred, thereby significantly reducing the Charpy value.

In the test number 22, the second weld metal was not formed; however, in the welding, the contact angle of the toe portion of the first weld metal was large, and the joint fatigue strength was significantly reduced at the time of the gigacycle.

In the test number 27, the depth $D_1$ of the second weld metal was too shallow, and therefore, melting of the toe portion of the first weld metal was insufficiently performed. As a result, the contact angle of the toe portion of the first weld metal was not smooth, and an effect of alleviating stress concentration was reduced. Because of this, the joint fatigue strength at the time of the gigacycle was significantly reduced.

Meanwhile, in the test number 28, the depth $D_1$ of the second weld metal was too deep, and therefore, a reinforcement height formed by the second weld metal was high, and the contact angle at the toe portion was large. As a result, the joint fatigue strength at the time of the gigacycle was significantly reduced. In addition, embrittlement of tissues in the vicinity of the surface of the steel plate by the second weld metal intensely occurred, thereby significantly reducing the Charpy value.

In the test number 29, the width $W_1$ and the width $W_3$ of the first weld metal were too wide in comparison with the plate thickness of the steel plate, and therefore, embrittlement of tissues on the surface of the steel plate and inside the steel plate intensely occurred, thereby significantly reducing the Charpy value.

In the test number 30, the second weld metal was formed by TIG welding; however, the width $W_2$ of the second weld metal was too wide, and melting of the toe portion of the first weld metal was sufficiently performed. However, the depth $D_1$ of the second weld metal became shallow, and therefore, the contact angle of the toe portion of the first weld metal was not smooth, and the effect of alleviating the stress concentration was reduced. In addition, embrittlement of tissues in the vicinity of the surface of the steel plate by the second weld metal intensely occurred. As a result, the joint fatigue strength at the time of the gigacycle was significantly reduced.

Industrial Applicability

The welding joint of the invention has fatigue-resistant properties to the vibration environment of the gigacycle range and sufficient fracture toughness, and thereby may be applied to a foundation member of the wind power-generating tower on the sea, and the like. For this reason, the invention has important industrial applicability.

| Reference Signs List | |
|---|---|
| 1 | steel plate |
| 1A | first surface |
| 1B | second surface |
| 2 | first weld metal |
| 3A | second weld metal |
| 3B | third weld metal |
| $D_1$ | depth of second weld metal |
| $D_2$ | depth of third weld metal |
| $W_1$ | width of first weld metal (on the first surface 1A) |
| $W_2$ | width of second weld metal (on the first surface 1A) |
| $W_3$ | width of first weld metal at center of plate thickness of steel plate |
| $W_4$ | width of first weld metal (on the second surface 1B) |
| $W_5$ | width of third weld metal (on the second surface 1B) |

| Reference Signs List | |
|---|---|
| 21 | steel plate |
| 22 | welding bead |
| ρ | radius of curvature of toe portion of welding bead |
| θ | contact angle of toe portion of welding bead |

The invention claimed is:

1. A butt-welded joint, comprising:
a pair of steel plates;
a first weld metal that is formed at a butting portion of the pair of steel plates, from a side of a first surface of the butt-welded joint to a side of a second surface opposite the first surface by irradiation of a first high-energy density beam from the side of the first surface; and
a second weld metal that is formed by irradiation of a second high-energy density beam to cover an end surface of the first weld metal at the side of the first surface,
wherein a width $W_1$ of the first weld metal on the first surface and a width $W_2$ of the second weld metal on the first surface satisfy an equation $1.2 \leq W_2/W_1 \leq 3.5$, and a depth of the second weld metal from the first surface is 2.0 mm to 10.0 mm,
wherein a width $W_3$ of the first weld metal at a center of a plate thickness of the pair of steel plates is 15% or less of the plate thickness of the pair of steel plates,
wherein the plate thickness of the pair of steel plates is 30 mm to 200 mm, and
wherein the width $W_1$ of the first weld metal on the first surface is 2% to 30% of the plate thickness of the pair of steel plates.

2. The butt-welded joint according to claim 1, further comprising:
a third weld metal that is formed by a third high-energy density beam to cover an end surface of the first weld metal at the side of the second surface,
wherein a width $W_4$ of the first weld metal on the second surface and a width $W_5$ of the third weld metal on the second surface satisfy an equation $1.2 \leq W_5/W_4 \leq 3.5$, and a depth of the third weld metal from the second surface is 2.0 mm to 10.0 mm.

3. The butt-welded joint according to claim 2, wherein yield strength of the pair of steel plates is 355 MPa or larger.

4. The butt-welded joint according to claim 1, wherein yield strength of the pair of steel plates is 355 MPa or larger.

5. The butt-welded joint according to claim 1, wherein a hardness of the first weld metal and the second weld metal is 110% to 150% of a hardness of the pair of steel plates.

* * * * *